United States Patent
Ito et al.

(10) Patent No.: US 11,908,995 B2
(45) Date of Patent: Feb. 20, 2024

(54) ALL SOLID BATTERY

(71) Applicant: TAIYO YUDEN CO., LTD., Tokyo (JP)

(72) Inventors: Daigo Ito, Takasaki (JP); Takato Satoh, Takasaki (JP); Sachie Tomizawa, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 157 days.

(21) Appl. No.: 17/335,988

(22) Filed: Jun. 1, 2021

(65) Prior Publication Data

US 2021/0328263 A1 Oct. 21, 2021

Related U.S. Application Data

(62) Division of application No. 16/177,204, filed on Oct. 31, 2018, now Pat. No. 11,056,716.

(30) Foreign Application Priority Data

Nov. 2, 2017 (JP) .................................. 2017-213073
Nov. 2, 2017 (JP) .................................. 2017-213074

(51) Int. Cl.
*H01M 10/0562* (2010.01)
*H01M 10/052* (2010.01)
(Continued)

(52) U.S. Cl.
CPC ..... *H01M 10/0562* (2013.01); *H01M 10/052* (2013.01); *H01M 10/0585* (2013.01);
(Continued)

(58) Field of Classification Search
CPC . H01M 2300/0068; H01M 2300/0077; H01M 10/0562; H01M 10/052
See application file for complete search history.

(56) References Cited

U.S. PATENT DOCUMENTS

| 4,977,007 A | 12/1990 | Kondo et al. |
| 2007/0042265 A1 | 2/2007 | Tamai et al. |
(Continued)

FOREIGN PATENT DOCUMENTS

| CN | 87107102 A | 6/1988 |
| CN | 103053061 A | 4/2013 |
(Continued)

OTHER PUBLICATIONS

English Translation of Mochigi et al., JP2014192041A (Year: 2014).*
(Continued)

*Primary Examiner* — Niki Bakhtiari
(74) *Attorney, Agent, or Firm* — Law Office of Katsuhiro Arai (57) ABSTRACT

An all solid battery includes: a solid electrolyte layer; a positive electrode layer provided on a first face of the solid electrolyte layer, a part of the positive electrode layer extending to a first edge portion of the solid electrolyte layer; a first margin layer that is provided on an area of the solid electrolyte layer where the positive electrode is not provided; a negative electrolyte layer provided on a second face of the solid electrolyte layer, a part of the negative electrolyte layer extending to a second edge portion of the solid electrolyte layer; a second margin layer that is provided on an area of the second face of the solid electrolyte layer where the negative electrolyte layer is not provided; wherein a main component of the first margin layer and the second margin layer is solid electrolyte of which ionic conductivity is lower than that of the solid electrolyte layer.

3 Claims, 8 Drawing Sheets

(51) Int. Cl.
   *H01M 10/0585* (2010.01)
   *H01M 50/15* (2021.01)

(52) U.S. Cl.
   CPC .... *H01M 50/15* (2021.01); *H01M 2300/0068* (2013.01); *H01M 2300/0071* (2013.01); *H01M 2300/0077* (2013.01)

(56) References Cited

U.S. PATENT DOCUMENTS

| | | |
|---|---|---|
| 2013/0149592 A1 | 6/2013 | Hayashi et al. |
| 2013/0266842 A1* | 10/2013 | Woehrle ............... C04B 35/447 429/188 |
| 2014/0272547 A1 | 9/2014 | Ramasubramanian et al. |
| 2016/0099453 A1 | 4/2016 | Anandan et al. |

FOREIGN PATENT DOCUMENTS

| | | |
|---|---|---|
| EP | 0260679 B1 | 5/1993 |
| JP | 2001185148 A | 7/2001 |
| JP | 2006261008 A | 9/2006 |
| JP | 2007080812 A | 3/2007 |
| JP | 2008198402 A | 8/2008 |
| JP | 2011198692 A | 10/2011 |
| JP | 2014192041 A | 10/2014 |
| JP | 2015195180 A | 11/2015 |
| JP | 2016076474 A | 5/2016 |
| JP | 2016517618 A | 6/2016 |
| JP | 2016207540 A | 12/2016 |

OTHER PUBLICATIONS

A Notice of Reasons for Refusal issued by the Japanese Patent Office, dated Aug. 31, 2021, for Japanese counterpart application No. 2017-213073. (6 pages).

Notice of Allowance issued by U.S. Patent and Trademark Office, dated Mar. 2, 2021, for related U.S. Appl. No. 16/177,204 (14 pages).

A First Office Action issued by the State Intellectual Property Office of China on Feb. 23, 2023, for Chinese counterpart application No. 201811300866.9 (6 pages).

* cited by examiner

FIG. 8 ial application of U.S. patent application Ser. No. 16/177,204, filed Oct. 31, 2018, which is based upon and claims the benefit of priority of the prior Japanese Patent Application No. 2017-213073 filed on Nov. 2, 2017 and Japanese Patent Application No. 2017-213074 filed on Nov. 2, 2017, each disclosure of which is incorporated herein by reference in the entirety. The applicant herein explicitly rescinds and retracts any prior disclaimers or disavowals or any amendment/statement otherwise limiting claim scope made in any parent, child or related prosecution history with regard to any subject matter supported by the present application.

ALL SOLID BATTERY

CROSS-REFERENCE TO RELATED APPLICATION

This application is a divisional application of U.S. patent application Ser. No. 16/177,204, filed Oct. 31, 2018, which is based upon and claims the benefit of priority of the prior Japanese Patent Application No. 2017-213073 filed on Nov. 2, 2017 and Japanese Patent Application No. 2017-213074 filed on Nov. 2, 2017, each disclosure of which is incorporated herein by reference in the entirety. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed. For the purpose of improving capacity density, it is demanded that a plurality of cell units are stacked. When the cell units are stacked, as a margin layer, a material is provided on a margin of an electrode (for example, Japanese Patent Application Publication No. 2014-192041 and Japanese Patent Application Publication No. 2016-207540). When the cell units are stacked, cover layers are provided on an upper face and a lower face of an all solid battery (for example, Japanese Patent Application Publication No. 2016-207540, Japanese Patent Application Publication No. 2007-80812, Japanese Patent Application Publication No. 2011-198692 and Japanese Patent Application Publication No. 2008-198402).

SUMMARY OF THE INVENTION

The margin layer contacts a solid electrolyte layer. Therefore, it is preferable that the margin layer is made of a material that does not mutually diffuse with the solid electrolyte layer. And so, it is thought that a composition of the material of the margin layer is the same as that of the solid electrolyte layer. However, in this case, an unexpected cell reaction may occur through a margin layer because of ion conduction in the margin layer.

It is preferable that the cover layer is made of a material that does not mutually diffuse with the solid electrolyte layer during firing. And so, it is thought that a composition of the material of the cover layer is the same as that of the solid electrolyte layer. However, when a plurality of the cell units are stacked into a cell module, an unexpected cell reaction may occur through a cover layer because of ion conduction in the cover layer.

The present invention has a purpose of providing an all solid battery that is capable of suppressing mutual diffusion between a solid electrolyte layer and another layer and suppressing an unexpected cell reaction through another layer.

According to an aspect of the present invention, there is provided an all solid battery including: a solid electrolyte layer; a positive electrode layer provided on a first face of the solid electrolyte layer, a part of the positive electrode layer extending to a first edge portion of the solid electrolyte layer; a first margin layer that is provided on an area of the solid electrolyte layer where the positive electrode is not provided; a negative electrode layer provided on a second face of the solid electrolyte layer, a part of the negative electrode layer extending to a second edge portion of the solid electrolyte layer; a second margin layer that is provided on an area of the second face of the solid electrolyte layer where the negative electrode layer is not provided; wherein a main component of the first margin layer and the second margin layer is solid electrolyte of which ionic conductivity is lower than that of the solid electrolyte layer.

According to an aspect of the present invention, there is provided an all solid battery including: a solid electrolyte layer; a positive electrode layer provided on a first face of the solid electrolyte layer; a negative electrode layer provided on a second face of the solid electrolyte layer; a first cover layer that is stacked as a first outermost layer in a multilayer structure in a stacking direction, the multilayer structure including the solid electrolyte layer, the positive electrode layer and the negative electrode layer; and a second cover layer that is stacked as a second outermost layer that is opposite to the first outermost layer, in the multilayer structure, wherein a main component of the first cover layer and the second cover layer is solid electrolyte of which ionic conductivity is lower than that of the solid electrolyte layer.

DETAILED DESCRIPTION

A description will be given of an embodiment with reference to the accompanying drawings.

Figure 1:
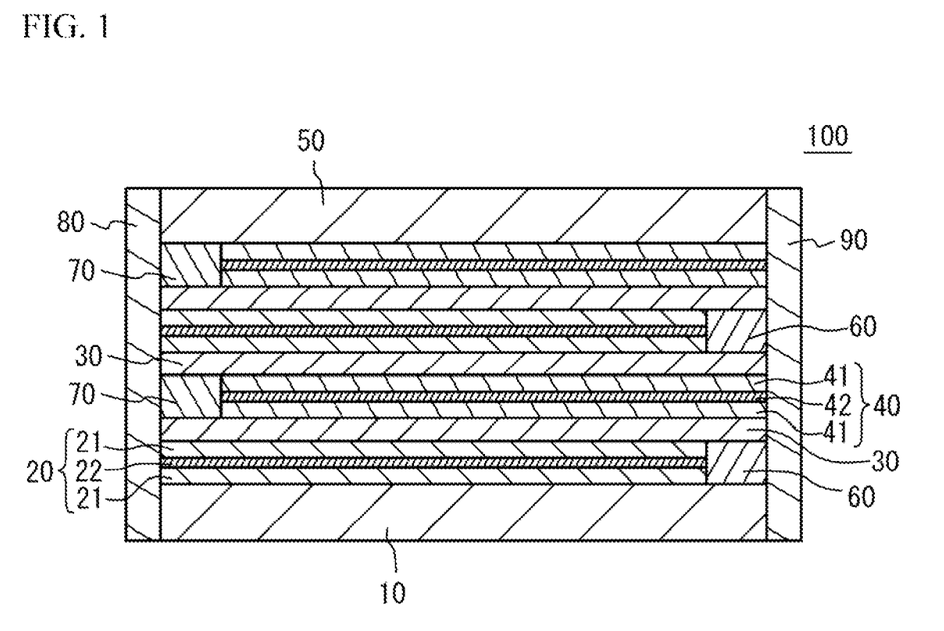
FIG. 1 illustrates a schematic cross section of an all solid battery in accordance with an embodiment.
Figure 2:
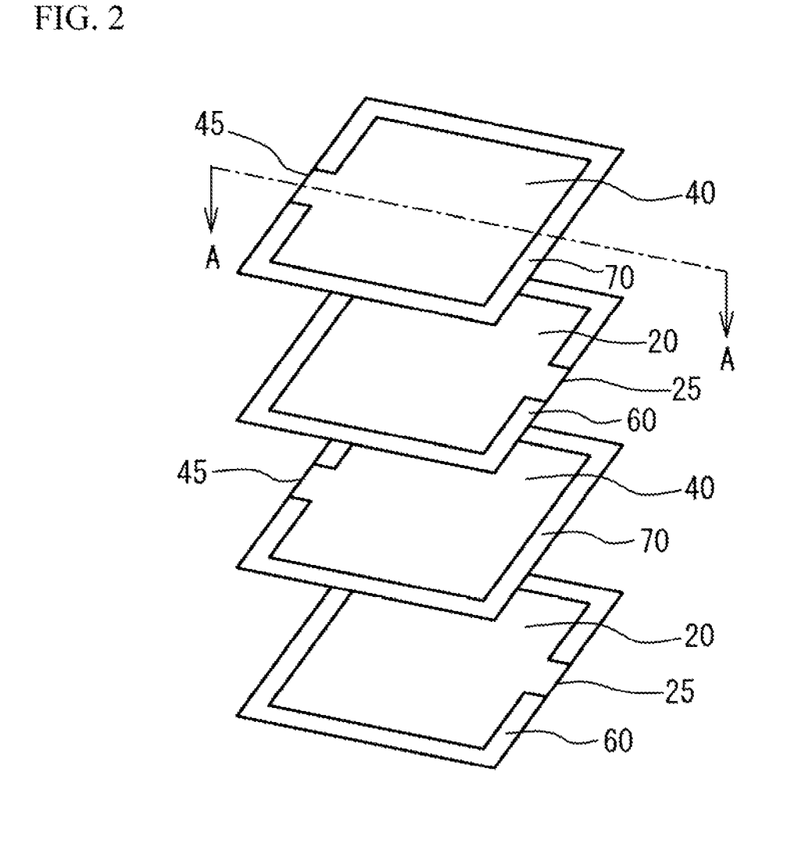
FIG. 2 illustrates an exploded diagram of a multilayer structure of a positive electrode and a negative electrode.

(Embodiment) FIG. 1 illustrates a schematic cross sectional view of an all solid battery 100 in accordance with an embodiment. FIG. 2 illustrates an exploded diagram of a multilayer structure of a positive electrode 20 and a negative electrode 40 described later. FIG. 1 corresponds to a cross section taken along a line A-A of FIG. 2. In FIG. 2, a solid electrolyte layer 30 described later is omitted.

The all solid battery 100 has a parallelepiped shape. As illustrated in FIG. 1, the all solid battery 100 has a structure in which a first stack unit and a second stack unit are alternately stacked on a first cover layer 10. In the first stack unit, the solid electrolyte layer 30 is stacked on the positive electrode 20. In the second stack unit, the solid electrolyte layer 30 is stacked on the negative electrode 40. When an uppermost stack unit is the first stack unit, the negative electrode 40 and the second cover layer 50 are stacked in this order on the uppermost first stack unit. When the uppermost stack unit is the second stack unit, the positive electrode 20 and a second cover layer 50 are stacked in this order on the uppermost second stack unit. Each of the solid electrolyte layers 30 has substantially the same shape. Two adjacent solid electrolyte layers 30 sandwich the positive electrode 20 or the negative electrode 40 and face with each other.

As illustrated in FIG. 1 and FIG. 2, in the first stack unit, on a lower face of the solid electrolyte layer 30, a part of the positive electrode 20 extends to a first edge portion 25 that is one of edge faces of the solid electrolyte layer 30. On the lower face of the solid electrolyte layer 30, a first margin layer 60 having substantially the same thickness as that of the positive electrode 20 is provided on a surrounding area where the positive electrode 20 is not provided.

In the second multilayer unit, on a lower face of the solid electrolyte layer 30, a part of the negative electrode 40 extends to a second edge portion 45 that is the other of edge faces of the solid electrolyte layer 30. The edge faces of the solid electrolyte layer 30 face with each other. On the lower face of the solid electrolyte layer 30, a second margin layer 70 having substantially the same thickness as that of the negative electrode 40 is provided on a surrounding area where the negative electrode 40 is not provided.

The positive electrode 20 has a positive electrode layer 21 and an electric collector layer 22. As an example, the positive electrode 20 has a structure in which two of the positive electrode layers 21 sandwich the electric collector layer 22. On the first edge portion, a first external electrode 80 is provided and is connected to each of the electric collector layers 22. The negative electrode 40 has a negative electrode layer 41 and an electric collector layer 42. As an example, the negative electrode 40 has a structure in which two of the negative electrode layers 41 sandwich the electric collector layer 42. On the second edge portion, a second external electrode 90 is provided and is connected to each of the electric collector layers 42. A thickness of each layer is not limited. However, when the electrode layer is excessively thin, it is not easy to enhance a capacity density. When the electrode layer is excessively thick, responsibility (output characteristic) of the all solid battery 100 may be degraded. And so, it is preferable that the thickness of the positive electrode layer 21 and the negative electrode layer 41 is 1 µm to 100 µm. It is more preferable that the thickness is 2 µm to 50 µm. When the electric collector layer is excessively thin, a continuity of the electric collector layer may be degraded. That is, an effective area of the all solid battery 100 may be reduced. The electric collector layer does not contribute to the cell capacity. Therefore, when the electric collector layer is excessively thick, the capacity density may be degraded. And so, it is preferable that the thickness of the electric collector layer 22 and the electric collector layer 42 is 0.1 µm to 5 µm. It is more preferable that the thickness is 1 µm to 3 µm.

The cross section of FIG. 1 includes the part of the positive electrode 20 extending to the first edge portion 25 and the part of the negative electrode 40 extending to the second edge portion 45. Therefore, in the stacking direction of FIG. 1, the negative electrode 40 is positioned between the first margin layer 60 and another first margin layer 60. In the stacking direction of FIG. 1, the positive electrode 20 is positioned between the second margin layer 70 and another second margin layer 70.

Figure 3:
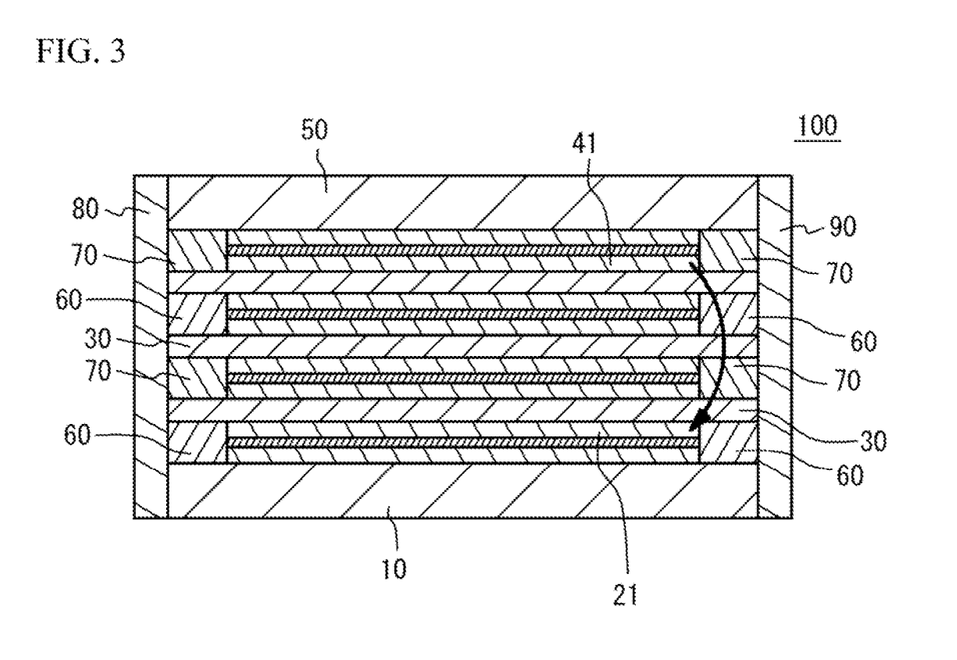
FIG. 3 illustrates a schematic cross section of an all solid battery in accordance with an embodiment.
Figure 4:
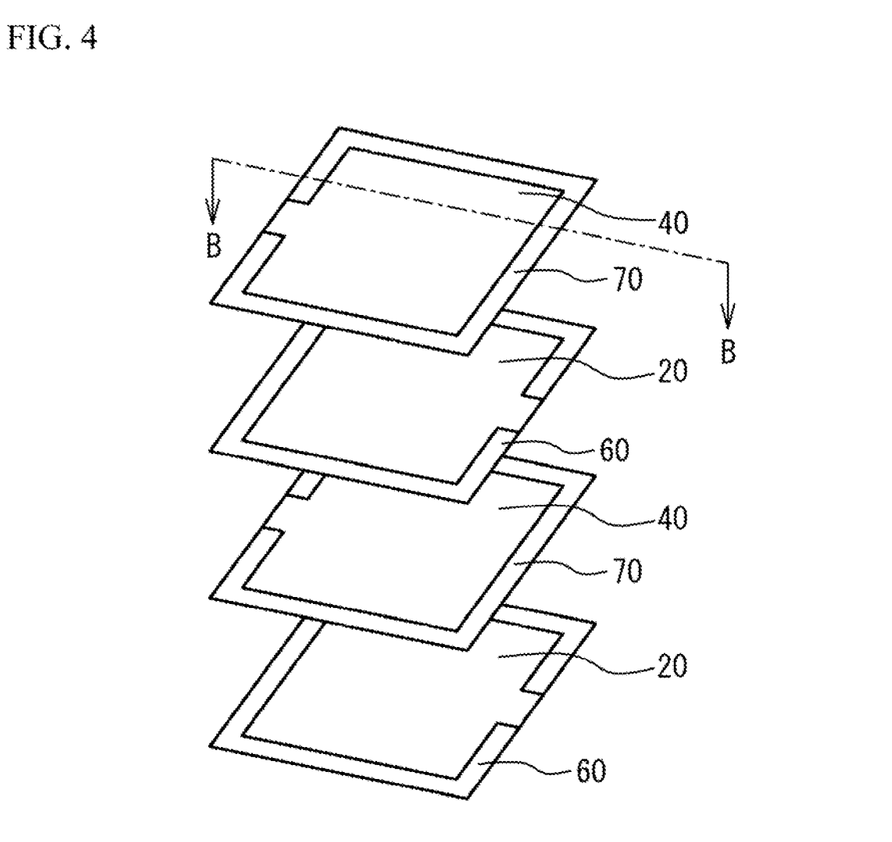
FIG. 4 illustrates an exploded diagram of a multilayer structure of a positive electrode and a negative electrode.

FIG. 3 illustrates a schematic cross section of the all solid battery 100. FIG. 4 illustrates an exploded diagram of a multilayer structure of the positive electrode 20 and the negative electrode 40. FIG. 3 corresponds to a cross section taken along a line B-B of FIG. 4. The B-B line cross section includes neither the part of the positive electrode 20 extending to the first edge portion 25 nor the part of the negative electrode 40 extending to the second edge portion 45. Therefore, in the stacking direction of FIG. 3, instead of the negative electrode 40, the second margin layer 70 is positioned between the first margin layer 60 and another first margin layer 60. In the stacking direction of FIG. 3, instead of the positive electrode 20, the first margin layer 60 is positioned between the second margin layer 70 and another second margin layer 70.

Figure 5A:
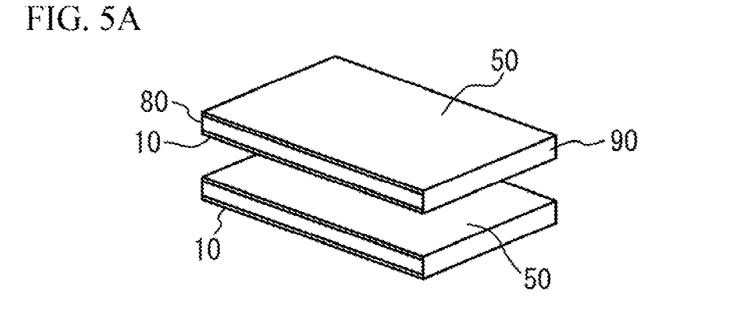
FIG. 5A to FIG. 5C illustrate a cell module.
Figure 5B:
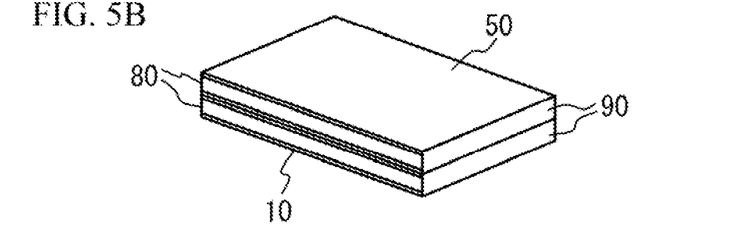

A cell module including the all solid battery 100 has a structure in which a plurality of the all solid batteries 100 are connected in parallel. For example, as illustrated in FIG. 5A, a first all solid battery 100 and a second all solid battery 100 are stacked so that the second cover layer 50 of the first all solid battery 100 faces with the first cover layer 10 of the second all solid battery 100. As illustrated in FIG. 5B, the first all solid battery 100 and the second all solid battery 100 are stacked so that the second external electrode 90 of the first all solid battery 100 and the second external electrode 90 of the second all solid battery 100 form an identical plane. The first all solid battery 100 and the second all solid battery 100 are connected in parallel, when the first external electrode 80 of the first all solid battery 100 is connected to the first external electrode 80 of the second all solid battery 100, and the second external electrode 90 of the first all solid battery 100 is connected to the second external electrode 90 of the second all solid battery 100.

On the multilayer structure of the first all solid battery 100 and the second all solid battery 100, another multilayer structure having the same structure may be stacked. When the second external electrode 90 of another all solid battery 100 is connected to the first external electrode 80, two all solid battery 100 are connected in series.

Figure 5C:
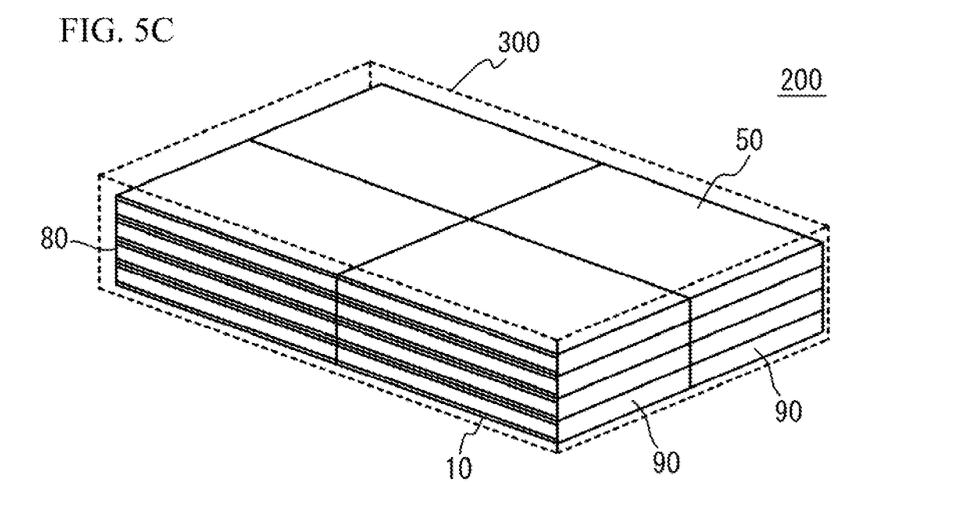

In the embodiment, as illustrated in FIG. 5C, as an example, a cell module 200 has a structure in which eight pairs in each of which two all solid batteries 100 are connected in series are connected in parallel. These all solid batteries 100 are, for example, housed in an outer can 300.

At least, the solid electrolyte layer 30 is an oxide-based solid electrolyte. For example, a main component of the solid electrolyte layer 30 is oxide-based solid electrolyte having a NASICON structure. The oxide-based solid electrolyte having the NASICON structure has a high ionic conductivity and is stable in normal atmosphere. The oxide-based solid electrolyte having the NASICON structure is, for example, such as a salt of phosphoric acid including lithium. The salt of phosphoric acid is not limited. For example, the salt of phosphoric acid is such as composite salt of phosphoric acid with Ti (for example $Li_{1+x}Al_xTi_{2-x}(PO_4)_3$). $Li_{1+x}Al_xTi_{2-x}(PO_4)_3$ may be called as LATP. Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the salt of phosphoric acid including lithium and having the NASICON structure is Li—Al—Ge—P—O-based material (for example, $Li_{1+x}Al_xGe_{2-x}(PO_4)_3$), Li—Al—Zr—P—O based material (for example, $Li_{1+x}Al_xZr_{2-x}(PO_4)_3$), Li—Al—Ti—P—O based material (for example, $Li_{1+x}Al_xTi_{2-x}(PO_4)_3$) or the like. $Li_{1+x}Al_xGe_{2-x}(PO_4)_3$ may be called as LAGP. $Li_{1+x}Al_xZr_{2-x}(PO_4)_3$ may be called as LAZP. For example, it is preferable that LAGP-based material, to which a transition metal included in the salt of phosphoric acid having the olivine type crystal structure included in the positive electrode layer 21 and the negative electrode layer 41 is added in advance, is used. For example, when the positive electrode layer 21 and the negative electrode layer 41 include a salt of phosphoric acid including Co and Li, it is preferable that the solid electrolyte layer 30 includes LAGP-based material to which Co is added in advance. In this case, it is possible to suppress solving of the transition metal included in the electrode active material into the electrolyte.

The positive electrode layer 21 includes a material having an olivine type crystal structure, as an electrode active material. It is preferable that the negative electrode layer 41 also includes the electrode active material. The electrode active material is such as a salt of phosphoric acid including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the positive electrode layer 2. For example, when only the positive electrode layer 21 includes the electrode active material having the olivine type crystal structure, the electrode active material acts as the positive electrode active material. When the negative electrode layer 41 also includes an electrode active material having the olivine type crystal structure, discharge capacity may increase and an operation voltage may increase because of electric discharge, in the negative electrode layer 41. The function mechanism is not completely clear. However, the mechanism may be caused by partial solid-phase formation together with the negative electrode active material.

When both the positive electrode layer 21 and the negative electrode layer 41 include an electrode active material having the olivine type crystal structure, the electrode active material of each of the positive electrode layer 21 and the negative electrode layer 41 may have a common transition metal. Alternatively, the transition metal of the electrode active material of the positive electrode layer 21 may be different from that of the negative electrode layer 41. The positive electrode layer 21 and the negative electrode layer 41 may have only single type of transition metal. The positive electrode layer 21 and the negative electrode layer 41 may have two or more types of transition metal. It is preferable that the positive electrode layer 21 and the negative electrode layer 41 have a common transition metal. It is more preferable that the electrode active materials of the both electrode layers have the same chemical composition.

When the positive electrode layer 21 and the negative electrode layer 41 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The negative electrode layer 41 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the negative electrode layer 41. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid, a carbon, a vanadium lithium phosphate.

In the forming process of the positive electrode layer 21 and the negative electrode layer 41, moreover, oxide-based solid electrolyte material or a conductive material (conductive auxiliary agent) such as a carbon or a metal may be added. When the material is evenly dispersed into water or organic solution together with binder or plasticizer, a paste for electrode layer is obtained. Pd, Ni, Cu, or Fe, or an alloy thereof may be used as a metal of the conductive auxiliary agent.

A conductive material such as a carbon or a metal may be used as the electric collector layers 22 and 42. A simple metal substance such as Ni, Cu, Pd, Ag, Pt, Au, Al or Fe, or an alloy thereof, or an oxide thereof may be used as the conductive material.

In order to suppress the composition changing of the solid electrolyte layer 30, it is preferable that mutual diffusion does not occur between the first margin layer 60 and the solid electrolyte layer 30 and between the second margin layer 70 and the solid electrolyte layer 30 during firing. Therefore, it is thought that the first margin layer 60 and the second margin layer 70 have a composition similar to that of the solid electrolyte layer 30. And so, in the embodiment, a main component of the first margin layer 60 and the second margin layer 70 is oxide-based solid electrolyte.

However, when the main component of the first margin layer 60 and the second margin layer 70 is the oxide-based solid electrolyte, ionic conductivity of the first margin layer 60 and the second margin layer 70 may be large. When the ionic conductivity of the first margin layer 60 and the second margin layer 70 is high, cell reaction may occur between an electrode layer and a counter electrode layer that is not next to the electrode layer but is far from the electrode layer, through a margin layer and the solid electrolyte layer 30. For example, as indicated by an arrow of FIG. 3, in addition to a cell reaction between the positive electrode layer 21 of the positive electrode 20 and the nearest negative electrode layer 41 of the nearest negative electrode 40 facing the positive electrode layer 21 through the solid electrolyte layer 30, another cell reaction may occur between the positive electrode layer 21 and another negative electrode layer 41 of another negative electrode 40 that is not the nearest electrode from the positive electrode 20. And so, in the embodiment, the first margin layer 60 and the second margin layer 70 have lower ion conductivity than the solid electrolyte layer 30.

With the structure, it is possible to suppress the mutual diffusion between the first margin layer 60 and the solid electrolyte layer 30 and between the second margin layer 70 and the solid electrolyte layer 30 during the firing and suppress the unexpected cell reaction. It is possible to determine whether the ionic conductivity is high or low, by comparing total ionic conductivity at the same temperature.

The total ion conductivity is calculated from a total resistance value of the bulk resistance and grain boundary resistance.

Next, a description will be given of a concrete composition of the first margin layer 60 and the second margin layer 70. When the solid electrolyte layer 30 has a Li-X-Y-P—O composition of the NASICON type, it is preferable that the first margin layer 60 and the second margin layer 70 also have the Li-X-Y-P—O composition of the NASICON type. The X site is a metal element, of which a valence is three, such as Al or Ga. The Y site is a transition metal such as Ti, Ge or Zr. For example, it is preferable that a composition ratio of Zr in the first margin layer 60 and the second margin layer 70 is higher than that of the solid electrolyte layer 30, and the ionic conductivity of the first margin layer 60 and the second margin layer 70 is reduced. For example, it is preferable that the ratio of Zr in the transition metal in the Y site is 50% or less in the solid electrolyte layer 30. It is more preferable that the ratio of Zr is 30% or less. It is still more preferable that the ratio of Zr is 10% or less. And, it is preferable that the ratio of Zr in the transition metal in the Y site is 50% or more in the first margin layer 60 and the second margin layer 70. It is more preferable that the ratio of Zr is 70% or more. It is still more preferable that the ratio of Zr is 90% or more.

In order to suppress the composition changing of the solid electrolyte layer 30, it is preferable that mutual diffusion does not occur between the first cover layer 10 and the solid electrolyte layer 30 and between the second cover layer 50 and the solid electrolyte layer 30 during firing. Therefore, it is thought that the first cover layer 10 and the second cover layer 50 have a composition similar to that of the solid electrolyte layer 30. And so, in the embodiment, a main component of the first cover layer 10 and the second cover layer 50 is oxide-based solid electrolyte.

However, when the main component of the first cover layer 10 and the second cover layer 50 is the oxide-based solid electrolyte, ion conductivity of the first cover layer 10 and the second cover layer 50 may be large. When the ionic conductivity of the first cover layer 10 and the second cover layer 50 is high, ionic conduction may occur in the first cover layer 10 and the second cover layer 50. In this case, in the cell module 200 illustrated in FIG. 5A to FIG. 5C, between the first cover layer 10 and the second cover layer 50 facing each other, unexpected cell reaction may occur between the positive electrode 20 and the negative electrode 40. When a plurality of all solid batteries 100 are stacked as in the case of the cell module 200, the thickness of the first cover layer 10 and the second cover layer 50 is as small as possible (for example 30 μm or less) and a clearance between the all solid batteries is reduced for the purpose of improving the capacity density. Therefore, the unexpected cell reaction may easily occur. And so, in the embodiment, the first cover layer 10 and the second cover layer 50 have lower ionic conductivity than the solid electrolyte layer 30.

With the structure, it is possible to suppress the mutual diffusion between the first cover layer 10 and the solid electrolyte layer 30 and between the second cover layer 50 and the solid electrolyte layer 30 during the firing and suppress the unexpected cell reaction. It is possible to determine whether the ionic conductivity is high or low, by comparing total ion conductivity at the same temperature. The total ion conductivity is calculated from a total resistance value of the bulk resistance and grain boundary resistance.

Next, a description will be given of a concrete composition of the first cover layer 10 and the second cover layer 50. When the solid electrolyte layer 30 has a Li-X-Y-P—O composition of the NASICON type, it is preferable that the first cover layer 10 and the second cover layer 50 also have the Li-X-Y-P—O composition of the NASICON type. The X site is a metal element, of which a valence is three, such as Al or Ga. The Y site is a transition metal such as Ti, Ge or Zr. For example, it is preferable that a composition ratio of Zr in the first cover layer 10 and the second cover layer 50 is higher than that of the solid electrolyte layer 30, and the ionic conductivity of the first cover layer 10 and the second cover layer 50 is reduced. For example, it is preferable that the ratio of Zr in the transition metal in the Y site is 50% or less in the solid electrolyte layer 30. It is more preferable that the ratio of Zr is 30% or less. It is still more preferable that the ratio of Zr is 10% or less. And, it is preferable that the ratio of Zr in the transition metal in the Y site is 50% or more in the first cover layer 10 and the second cover layer 50. It is more preferable that the ratio of Zr is 70% or more. It is still more preferable that the ratio of Zr is 90% or more.

It is possible to apply the solid electrolyte having the NASICON type crystal structure including Zr to the solid electrolyte layer 30. When the solid electrolyte is Li—Zr—P—O (for example, a triclinic structure) that is a low ionic conductivity phase, an internal resistance of the cell may be enlarged. And so, it is preferable that a large amount of Li—Zr—P—O having a rhombohedron structure is included. On the other hand, it is preferable that Li—Zr—P—O that is a low ionic conductivity phase is used as a main component of the solid electrolyte applied to the first margin layer 60 and the second margin layer 70. It is not preferable that Li—Zr—P—O that is a high ionic conductivity phase (a rhombohedron structure) is used because the unexpected cell reaction may occur. Hereinafter, Li—Zr—P—O is also called as LZP. For example, when the solid electrolyte applied to the solid electrolyte layer 30 is LAGP ($Li_{1.5}Al_{0.5}Ge_{1.5}(PO_4)_3$), it is preferable that the solid electrolyte applied to the first margin layer 60 and the second margin layer 70 is LAZP ($Li_{1.5}Al_{0.5}Zr_{1.5}(PO_4)_3$) having the same composition in a viewpoint of suppressing the mutual diffusion during the firing. It is preferable that Li—Zr—P—O that is a low ionic conductivity phase is used as a main component of the solid electrolyte applied to the first cover layer 10 and the second cover layer 50. It is not preferable that Li—Zr—P—O that is a high ionic conductivity phase (a rhombohedron structure) is used because the unexpected cell reaction may occur. For example, when the solid electrolyte applied to the solid electrolyte layer 30 is LAGP ($Li_{1.5}Al_{0.5}Ge_{1.5}(PO_4)_3$), it is preferable that the solid electrolyte applied to the first cover layer 10 and the second cover layer 50 is LAZP ($Li_{1.5}Al_{0.5}Zr_{1.5}(PO_4)_3$) having the same composition in a viewpoint of suppressing the mutual diffusion during the firing.

A definition of the high ionic conductivity and the low ionic conductivity in an ionic conductor is described. It is possible to define the high ionic conductivity that a total ionic conductivity at a room temperature is $1 \times 10^{-5}$ S/cm or more. It is possible to define the low ionic conductivity that a total ionic conductivity at a room temperature is less than $1 \times 10^{-6}$ S/cm. In this manner, there is a difference more than one digit between the high ionic conductivity and the low ionic conductivity in the ionic conductor. In the embodiment, the first margin layer 60 and the second margin layer 70 may not necessarily act as an ionic conductor. It is therefore preferable that the total ionic conductivity of the first margin layer 60 and the second margin layer 70 is lower than that of the solid electrolyte layer 30 by two digits or more. In the embodiment, the first cover layer 10 and the second cover layer 50 may not necessarily act as an ionic conductor. It is therefore preferable that the total ionic conductivity of the first cover layer 10 and the second cover layer 50 is lower than that of the solid electrolyte layer 30 by two digits or more.

Figure 6:
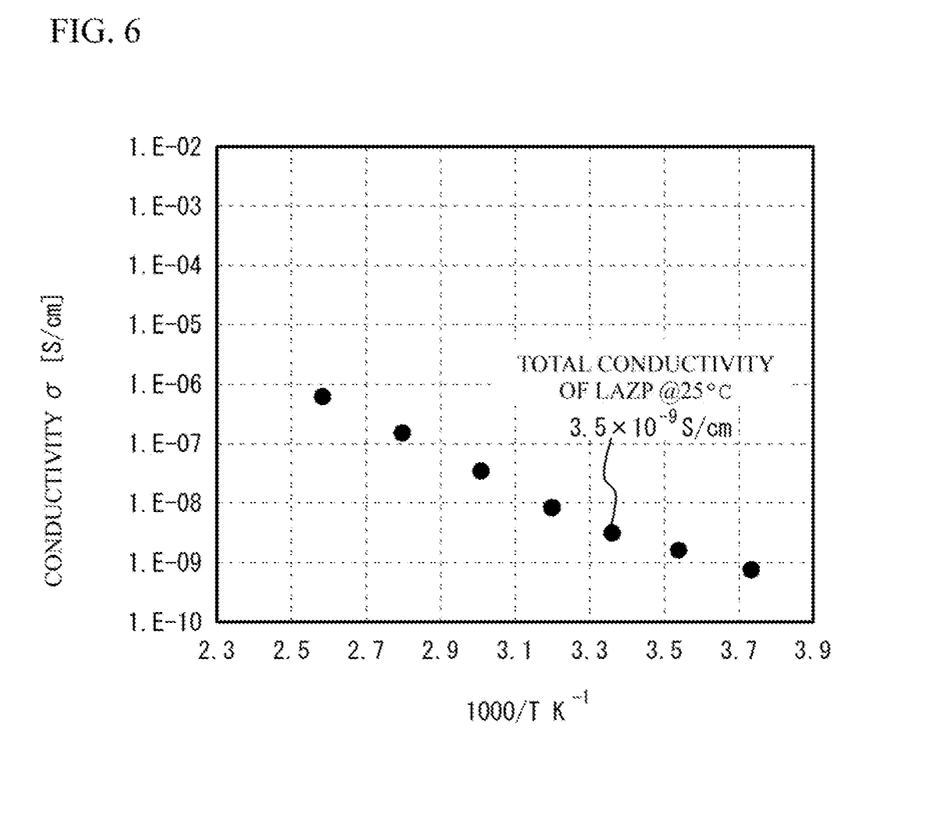
FIG. 6 illustrates total ionic conductivity of LAZP.
Figure 7:
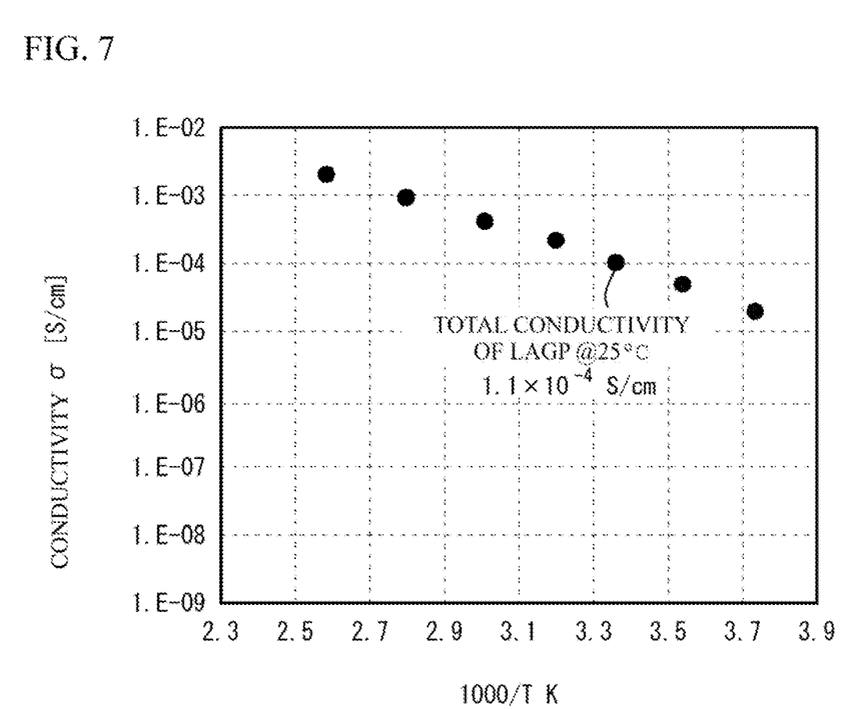
FIG. 7 illustrates the total ionic conductivity of LAGP.

FIG. 6 illustrates the total ionic conductivity of the LAZP. FIG. 7 illustrates the total ionic conductivity of the LAGP. For example, at a room temperature (25 degrees C.), the total ionic conductivity of the LAZP is $3.5 \times 10^{-9}$ S/cm, and the total ionic conductivity of the LAGP is $1.1 \times 10^{-4}$ S/cm. In this manner, at the room temperature, the total ionic conductivity of the LAZP is lower than that of the LAGP by approximately four-digit number. At other temperatures, similar results are obtained. It is therefore preferable that the LAZP is used as the first margin layer 60 and the second margin layer 70, and the LAGP is used as the solid electrolyte layer 30. It is preferable that the LAZP is used as the first cover layer 10 and the second cover layer 50, and the LAGP is used as the solid electrolyte layer 30.

In the embodiment, the main component of the first margin layer 60 and the second margin layer 70 is the oxide-based solid electrolyte. Therefore, the composition of the first margin layer 60 and the second margin layer 70 is similar to the composition of the solid electrolyte layer 30. It is therefore possible to suppress the mutual diffusion between the first margin layer 60 and the solid electrolyte layer 30 and between the second margin layer 70 and the solid electrolyte layer 30 during the firing. And it is possible to suppress the unexpected cell reaction through the first margin layer 60, the second margin layer 70 and the solid electrolyte layer 30, because the ionic conductivity of the first margin layer 60 and the second margin layer 70 is lower than that of the solid electrolyte layer 30.

In the embodiment, the main component of the first cover layer 10 and the second cover layer 50 is the oxide-based solid electrolyte. Therefore, the composition of the first cover layer 10 and the second cover layer 50 is similar to the composition of the solid electrolyte layer 30. It is therefore possible to suppress the mutual diffusion between the first cover layer 10 and the solid electrolyte layer 30 and between the second cover layer 50 and the solid electrolyte layer 30 during the firing. And it is possible to suppress the unexpected cell reaction through the first cover layer 10, the second cover layer 50 and the solid electrolyte layer 30, because the ionic conductivity of the first cover layer 10 and the second cover layer 50 is lower than that of the solid electrolyte layer 30.

Figure 8:
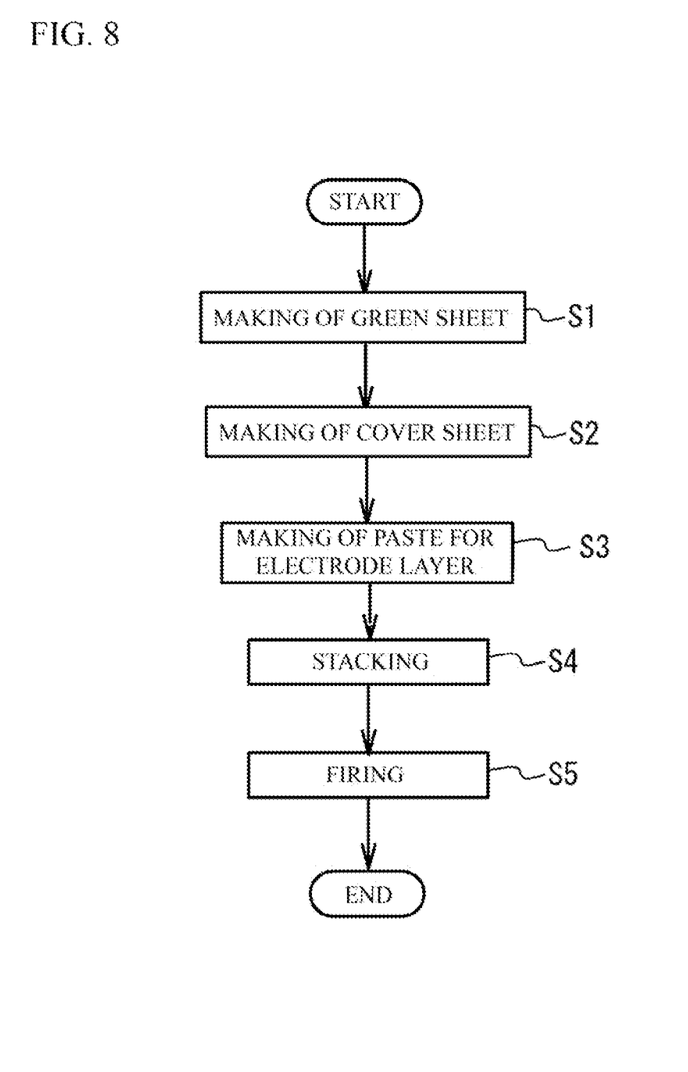
FIG. 8 illustrates a flowchart of a manufacturing method of an all solid battery.

Next, a description will be given of a manufacturing method of the all solid battery 100. FIG. 3 illustrates a flowchart of the manufacturing method of the all solid battery 100.

(Making process of green sheet) The powders of the oxide-based solid electrolyte structuring the solid electrolyte layer 30 is prepared so as to have appropriate particle size distribution. The resulting powders are evenly dispersed into aqueous solvent or organic solvent together with a binding agent, a dispersing agent, a plasticizer and so on. And slurry is obtained. In this case, a bead mill, a wet jet mill, a kneader, a high pressure homogenizer or the like may be used. It is preferable that the bead mill is used because adjusting of particle size distribution and dispersion are performed at the same time. The resulting slurry is coated. Thus, a green sheet having a desirable thickness is obtained. The coating method is not limited. For example, a slot die method, a reverse coat method, a gravure coat method, an over coat method, a doctor blade method or the like may be used.

(Making process of cover sheet) The powders of the oxide-based solid electrolyte structuring the first cover layer 10 is prepared so as to have appropriate particle size distribution. The resulting powders are evenly dispersed into aqueous solvent or organic solvent together with a binding agent, a dispersing agent, a plasticizer and so on. And slurry is obtained. In this case, a bead mill, a wet jet mill, a kneader, a high pressure homogenizer or the like may be used. It is preferable that the bead mill is used because adjusting of particle size distribution and dispersion are performed at the same time. The resulting slurry is coated. Thus, a cover sheet having a desirable thickness is obtained. The coating method is not limited. For example, a slot die method, a reverse coat method, a gravure coat method, an over coat method, a doctor blade method or the like may be used. A cover sheet for forming the second cover layer 50 can be made by the same method.

(Making process of paste for electrode layer) A conductive auxiliary agent, an active material, a solid electrolyte material, a binder, a plasticizer and so on are evenly dispersed into water or organic solvent. Thus, a paste for electrode layer is obtained. The paste is used for forming the positive electrode layer 21 and the negative electrode layer 41. Pd, Ni, Cu, Fe or an alloy thereof may be used as the conductive auxiliary agent. A printed layer of a conductive metal paste for the electric collector layers 22 and 42 is formed on one face of the paste for electrode layer. Moreover, a printed layer of the paste for electrode layer is formed on the printed layer.

(Stacking process) The paste for electrode and the conductive metal paste for electronic collector layer are printed on the green sheet. The powders of the oxide-based solid electrolyte structuring the first margin layer 60 and the second margin layer 70 is prepared so as to have appropriate particle size distribution. The resulting powders are evenly dispersed into aqueous solvent or organic solvent together with a binding agent, a dispersing agent, a plasticizer and so on. And a paste for margin layer is obtained. Next, the paste for margin layer is printed on a margin area on the green sheet. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary. A necessary number of the green sheet is stacked. The cover sheets are stacked on outermost layers of the stacked structure and are compressed. Thus, a multilayer structure is obtained.

(Firing process) Next, the obtained multilayer structure is fired. The firing is performed in an oxidizing atmosphere or non-oxidizing atmosphere. A maximum temperature of the firing is 400 degrees C. to 1000 degrees C. It is preferable that the maximum temperature is 500 degrees C. to 900 degrees C. In order to sufficiently remove the binder before the maximum temperature, a temperature lower than the maximum temperature may be held in an oxidizing atmosphere. It is preferable that the multilayer structure is fired at a minimum temperature in an oxidizing atmosphere, in order to reduce the process cost. After firing, a re-oxidation process may be performed. In this manner, the all solid battery 100 is manufactured.

Although the embodiments of the present invention have been described in detail, it is to be understood that the various change, substitutions, and alterations could be made hereto without departing from the spirit and scope of the invention.

What is claimed is:

1. An all solid battery comprising:
   a solid electrolyte layer;
   a positive electrode layer provided on a first face of the solid electrolyte layer, a part of the positive electrode layer extending to a first edge portion of the solid electrolyte layer;
   a first margin layer that is provided on an area of the first face of the solid electrolyte layer where the positive electrode is not provided;
   a negative electrode layer provided on a second face of the solid electrolyte layer, a part of the negative electrode layer extending to a second edge portion of the solid electrolyte layer;
   a second margin layer that is provided on an area of the second face of the solid electrolyte layer where the negative electrode layer is not provided;
   wherein a most abundant component of the first margin layer and the second margin layer is solid electrolyte, wherein the first margin layer and the second margin layer have low ionic conductivity wherein a total ionic conductivity of the first margin layer and a total ionic conductivity of the second margin layer are each lower than a total ionic conductivity of the solid electrolyte layer by two digits or more at a same temperature, wherein the first margin layer and the second margin layer are made of a Li—Al—Z—P—O based material, and the solid electrolyte layer is a Li—Al—Ge—O based material.

2. The all solid battery as claimed in claim 1, wherein a most abundant component of the solid electrolyte layer is solid electrolyte having a NASICON type crystal structure.

3. The all solid battery as claimed in claim 1, further comprising:
   a first cover layer that is stacked as a first outermost layer in a multilayer structure in a stacking direction, the multilayer structure including the solid electrolyte layer, the positive electrode layer, the first margin layer, the negative electrode layer and the second margin layer; and
   a second cover layer that is stacked as a second outermost layer that is opposite to the first outermost layer, in the multilayer structure,
   wherein a composition of the first cover layer and the second cover layer is the same as that of the first margin layer and the second margin layer.

* * * * *

UNITED STATES PATENT AND TRADEMARK OFFICE
CERTIFICATE OF CORRECTION

PATENT NO. : 11,908,995 B2
APPLICATION NO. : 17/335988
DATED : February 20, 2024
INVENTOR(S) : Daigo Ito et al.

It is certified that error appears in the above-identified patent and that said Letters Patent is hereby corrected as shown below:

In the Claims

At Column 12, Line 5, in Claim 1, please delete "Li—Al—Z—P—O" and insert therefor --Li-Al-Zr-P-O--

At Column 12, Line 6, in Claim 1, please delete "Li—Al—Ge—O" and insert therefor --Li-Al-Ge-P-O--

Signed and Sealed this
Ninth Day of April, 2024

Katherine Kelly Vidal
*Director of the United States Patent and Trademark Office*